US007181609B2

(12) United States Patent
Connor et al.

(10) Patent No.: US 7,181,609 B2
(45) Date of Patent: Feb. 20, 2007

(54) SYSTEM AND METHOD FOR ACCELERATED DEVICE INITIALIZATION

(75) Inventors: Patrick L. Connor, Portland, OR (US); Mark V. Montecalvo, Hillsboro, OR (US); Douglas D. Boom, Portland, OR (US); Scott P. Dubal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 521 days.

(21) Appl. No.: 10/641,681

(22) Filed: Aug. 15, 2003

(65) Prior Publication Data
US 2005/0038981 A1    Feb. 17, 2005

(51) Int. Cl.
*G06F 15/177* (2006.01)
(52) U.S. Cl. .............................................. 713/2; 713/1
(58) Field of Classification Search ................ 713/1, 713/2, 100
See application file for complete search history.

(56) References Cited

U.S. PATENT DOCUMENTS 5,999,989 A * 12/1999 Patel ............................. 710/1
6,317,828 B1 * 11/2001 Nunn ............................ 713/2
6,336,185 B1 * 1/2002 Sargenti et al. ................ 713/2
6,598,159 B1 * 7/2003 McAlister et al. ............. 713/2
6,732,264 B1 * 5/2004 Sun et al. ...................... 713/2
2004/0260917 A1 * 12/2004 Edrich ........................... 713/1

OTHER PUBLICATIONS

Leni Mayo, Introducing serel, Aug. 2002, pp. 1-10 (pp. 2 and 10 are blank).*
BIOS Boot Specification, Compaq Computer, Phoenix Technologies, Intel Corporation, Jan. 11, 1996, Version 1.01, pp. 1-46.*

* cited by examiner

*Primary Examiner*—Dennis M. Butler
(74) *Attorney, Agent, or Firm*—Joni D. Stutman-Horn

(57) ABSTRACT

A system and method for initialization of a computer system is described. Faster initialization of a computer system is possible by allowing certain device driver initialization tasks to overlap with other initialization and operating system tasks. option-ROMs resident on hardware device drivers define the initialization tasks to be performed prior to device driver initialization. Initial computer code for booting the computing device, such as a BIOS, is executed. As option-ROMs for hardware devices are scanned and executed, specific device initialization information is accessed from the devices and placed in pre-defined buffer areas. These accesses occur in parallel to other start up tasks. When device drivers are loaded, some of their initialization has already completed, thereby shortening the time necessary to boot the system.

29 Claims, 7 Drawing Sheets

SYSTEM AND METHOD FOR ACCELERATED DEVICE INITIALIZATION

FIELD OF THE INVENTION

An embodiment of the present invention relates generally to initialization of a computer system and, more specifically, to providing faster initialization of a computer system by allowing certain device initialization tasks to overlap with other initialization and system start up tasks.

BACKGROUND INFORMATION

During a computer system startup, or wake-up, the computer system is self-tested and initialized through loading and execution of system firmware. Under personal computer (PC) architectures, this firmware is commonly referred to as the system's Basic Input/Output System (BIOS). In a typical PC architecture, the BIOS is generally defined as the firmware that runs between the processor reset and the first instruction of the Operating System (OS) loader. This is commonly referred to as the pre-boot phase and precedes the OS boot phase. At the start of a pre-boot, very little of the system beyond the processor and firmware is actually initialized. It is up to the code in the firmware to initialize the system to the point that an operating system can take over.

Customer research shows that users frequently request fast system startup for their personal computers (PCs), whether from cold boot, or when resuming from standby or hibernation modes. Typical goals for the Microsoft® Windows™ XP operating system are: 1) boot to a useable state in a total of 30 seconds; 2) resume from Hibernate (S4) in a total of 20 seconds; and 3) resume from Standby (S3) in a total of 5 seconds. Boot and resume times are measured from the time the power switch is pressed to a user being able to start a program from a desktop shortcut, for instance, a word processor like Microsoft® Word®. Further information on the topic of fast boot goals can be found on web pages provided by Microsoft® Corporation, currently found at the web location: http://www.microsoft.com/hwdev/platform/performance/fastboot/fastboot-winxp.asp.

Testing shows that CPU (central processing unit) performance has little effect in reducing boot time, including driver loading, although a faster CPU does help in the WinLogon (log-on to the Windows™ OS) phase of boot-up. Therefore, Moore's Law will not fix this problem. Moore's Law, a commonly used industry predictor, named for Intel Corporation co-founder Gordon Moore, states that the number of transistors on a chip doubles approximately every two years. In other words, steadily increasing processing power of the CPU processing chips will not solve this problem.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any viable manner in one or more embodiments.

An embodiment of the present invention is a system and method relating to accelerated device initialization. In at least one embodiment, the disclosed system and method allows tasks specific to device initialization to start before a device driver initialization routine begins or before the operating system (OS) begins to load. An embodiment of the present system and method allows much of the device initialization operation to overlap with system and OS initialization operations, such as hard drive spin-up and boot loader.

Figure 1:
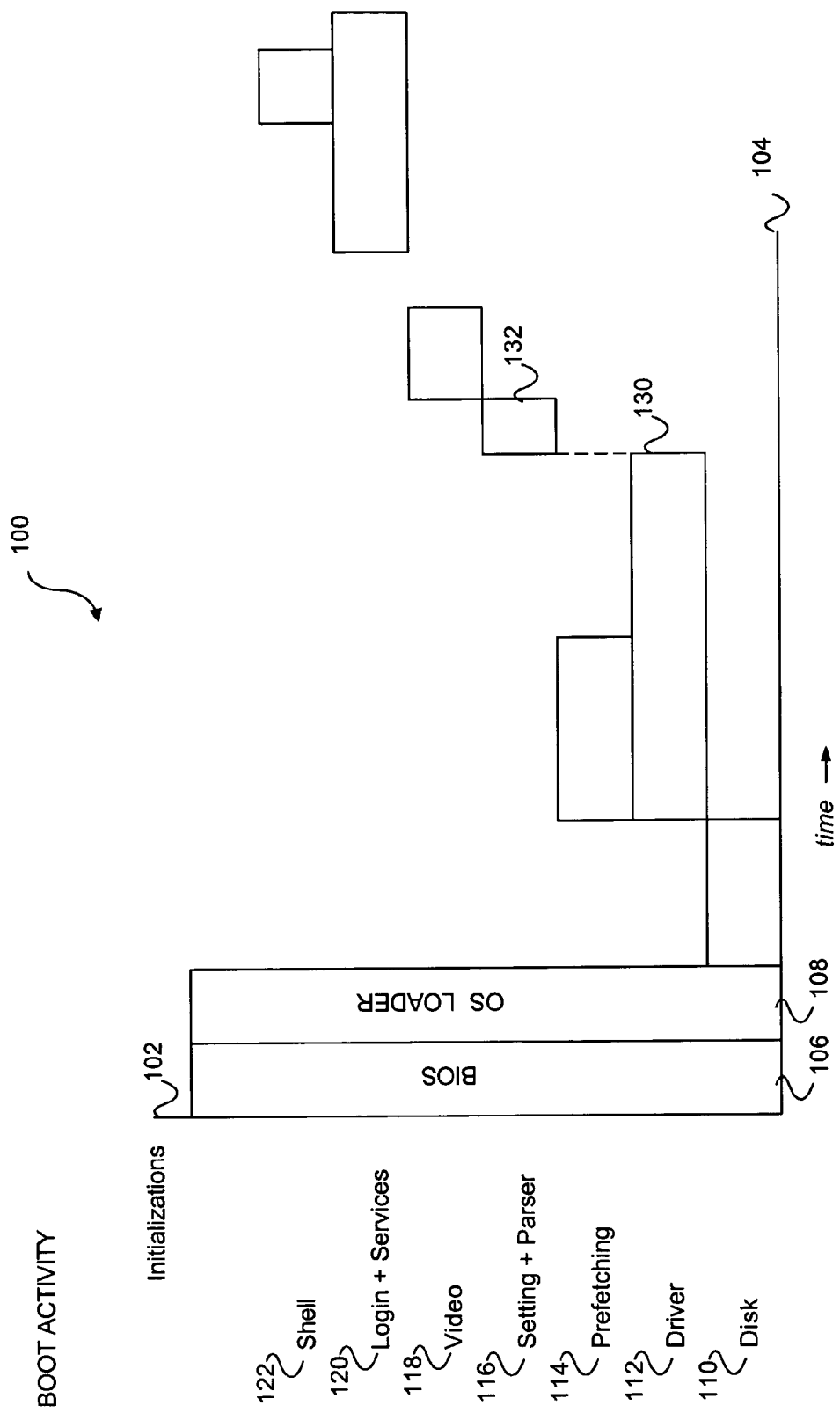
FIG. 1 shows a graph of boot activity where boot goals are not met.

Graph 100 of FIG. 1 is a depiction of prior art boot activity. The vertical axis 102 of chart 100 shows tasks performed at various stages of boot time. The horizontal axis 104 shows the passage of time. This exemplary graph is specific to a PC architecture using BIOS and OS loader for boot operation. The time taken for each stage and how its operations overlap with other operations is also shown. It will be apparent to one of ordinary skill in the art that the present system and method can be used for computing devices of various architectures and operating systems.

In this exemplary boot, the BIOS stage 106 includes scanning for the presence of hardware devices, programs, and allocation of resources such as memory decode space, DMA channels and interrupt values. A device may have executable code embedded in it as part of the device flash memory, or other on-board memory component, separate from the software device driver loaded during boot. This extended code is optional, and is typically called an "option-ROM." The BIOS scans devices and identifies installed option-ROMs (602 of FIG. 6).

The OS Loader stage 108 is where the OS starts, loads the kernel, device drivers and then the shell.

Disk spin-up 110 occurs to allow programs and files to be read from the disk. Driver initialization 112 may include driver fetching, scanning for related devices, reading settings, allocating memory, and configuring the underlying device. Prefetching 114 may include loading of operating system and application software this will be used during or soon after OS initiation from the hard drive to memory. One should note that prefetching 114 and driver initialization 112 overlap in time. Settings and Parsing 116 includes reading user preferences and other many other settings such as security policies and memory allocations. Video Initialization 118 occurs. Logon and OS Services 120 includes numerous client and server services and other OS functions. Shell initialization 122 includes presenting a user interface for the operating system.

All hardware components have a device driver, which is typically provided by a third party, i.e., the component manufacturer. Device drivers typically find the device, and then put the device into a known state. The device driver functions are then executed to perform tasks as needed.

Microsoft® Corporation reports that device drivers are the most common cause of boot delays. There are several reasons the device drivers' initializations tend to consume the majority of the system startup time. One reason for this is asynchronous hardware events. Many hardware initialization functions are not guaranteed to complete within a specified time or the time required to complete the operation is excessive. For instance, two such events that can consume a significant amount of time for a network adapter device are link establishment and EEPROM (electronic erasable programmable read only memory) reading.

Figure 2:
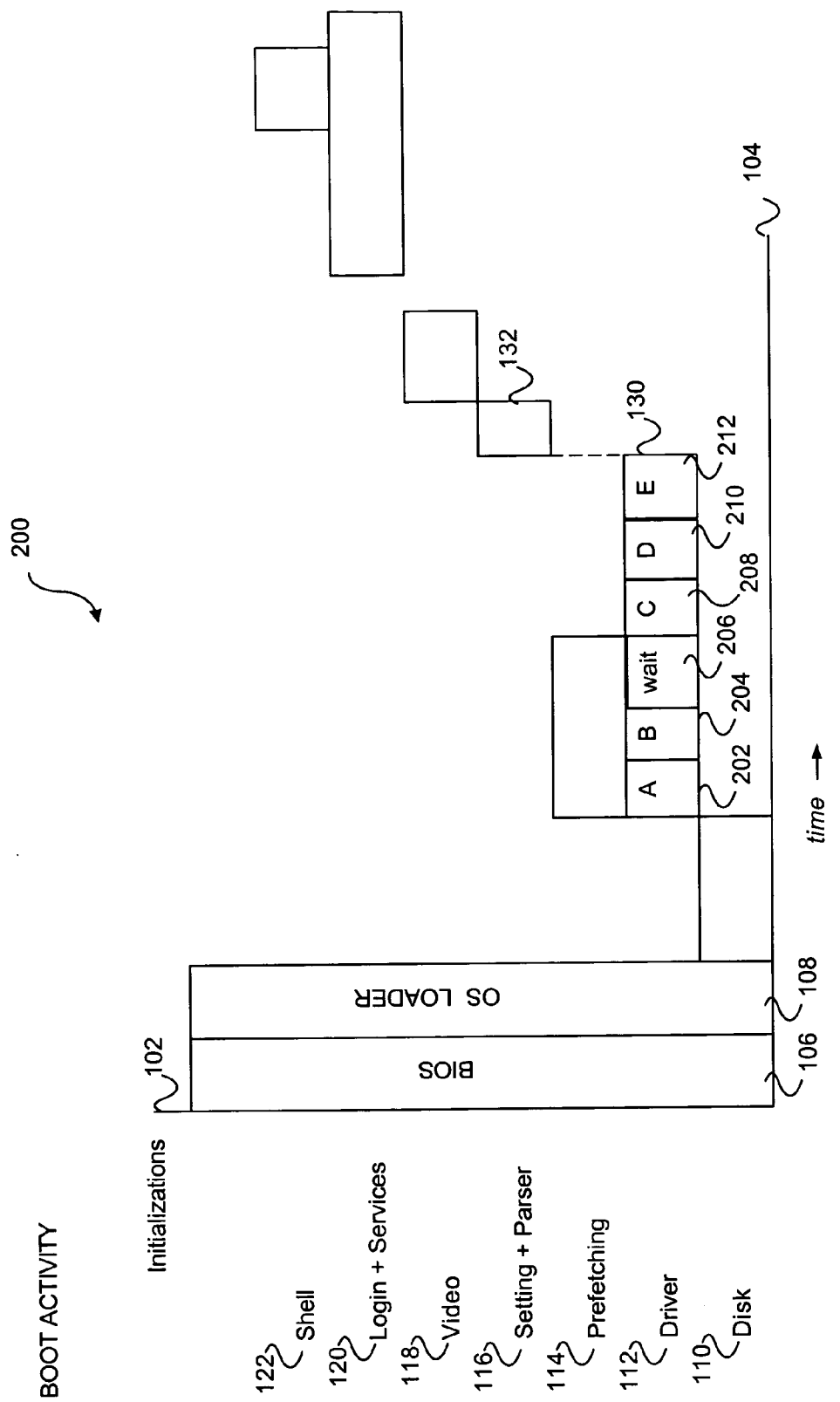
FIG. 2 shows the boot activity of FIG. 1 with wait latency highlighted during the device driver load phase.

An embodiment of the present system and method allows the OS to load drivers faster by putting a portion of device initialization into the option-ROM for a device. As shown in graph 200 of FIG. 2, many steps must occur sequentially, whiles others occur in parallel. For instance, the exemplary boot activity shown in FIG. 1 requires the driver initialization 130 to complete before Settings and Parsing step 132 can begin. In this example, driver initialization 130 may comprise five discrete steps, or tasks A 202, B 204, C 208, D 210 and E 212. In an exemplary boot using prior art methods, step C 208 must poll step B 204 and wait 206 for its completion before executing. It will be apparent to one of ordinary skill in the art that other drivers or sequences may have a different number of steps. In the system and method described herein, no polling is required or the polling time is significantly reduced. There is little or no waiting between steps because execution of operations requiring delays is initiated in the option-ROM code.

In one example, in FIG. 1, a network adapter driver, for instance in task 112, had taken an excessive amount of time to determine that it could not establish link. Determining link status, even when present, can be an isochronous event. Device drivers generally cannot assume anything about the state of the underlying hardware. It is possible that the hardware was recently under test and therefore configured in a diagnostic mode, or the hardware may have just completed POST (power on, self test) and be in power on defaults. Because of this unknown hardware state, device drivers often issue a global reset to the underlying hardware as the first step in hardware configuration. This places the hardware into a known state but it also means that any of the hardware operations, such as establishing link, that may have already completed after power up, are now restarted, thereby incurring additional delay.

Figure 5:
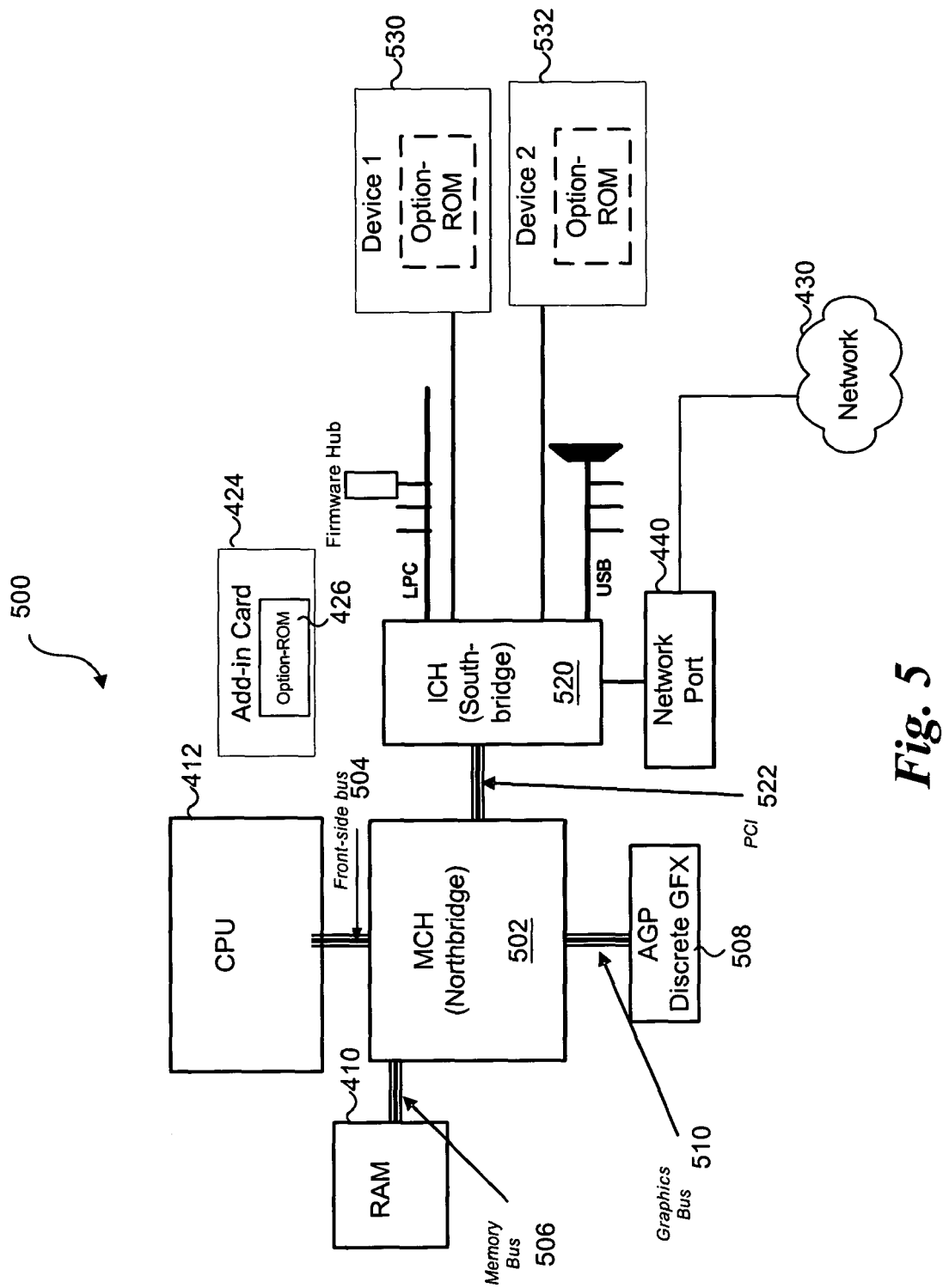
FIG. 5 is a block diagram of an exemplary computer system.

Another example of a delaying wait is during access of an EEPROM. EEPROMs operations such as reads and writes are often time consuming. A network adapter has an EEPROM to store, among other things, an identifier or MAC address. Non-volatile memory, such as an EEPROM, is relatively inexpensive, but slow in comparison to processor speeds. A clock signal is often required to shift data in and out of the EEPROM. When the device driver loads, a typical access is for the device controller to access the EEPROM and read the identifier information and program the network controller with this information. In one embodiment of this invention, the option-ROM starts the process of placing the identifier from the EEPROM into a specific location such as a device register or memory buffer. When the device driver loads, it then can retrieve the identifier from this location without waiting for the EEPROM. The device's option-ROM, which is run during the BIOS stage, programs the hardware to pull out the necessary data. Thus, the slow EEPROM access can occur while other tasks are occurring on the CPU. There is a reduced amount or no wait time 206 because the EEPROM read operation is complete. Information requests, as described above, can occur in parallel for multiple devices (i.e., 424, 530 and 532, as shown in FIG. 5). In other words, the BIOS executes the option-ROM of a subsequent device while the first device is fulfilling an option-ROM initiated operation. In this example, the option-ROM requests the identifier information to be posted, but does not wait for the access to complete before allowing the BIOS to continue with executing the next device's option-ROM.

An embodiment of the present system and method takes advantage of the fact that option-ROM code for a device executes before the operating system kernel starts to load. The option-ROM will initialize the device into a known state. This allows much of the hardware initialization to begin and possibly complete in parallel with the other startup operations before the device driver initialization begins.

The option-ROM of a device starts the device initialization process. This allows the device driver to load on a device that is in a well-known state and allows the device driver to maintain settings for operations that have completed, such as link determination on a network adapter.

Figure 3:
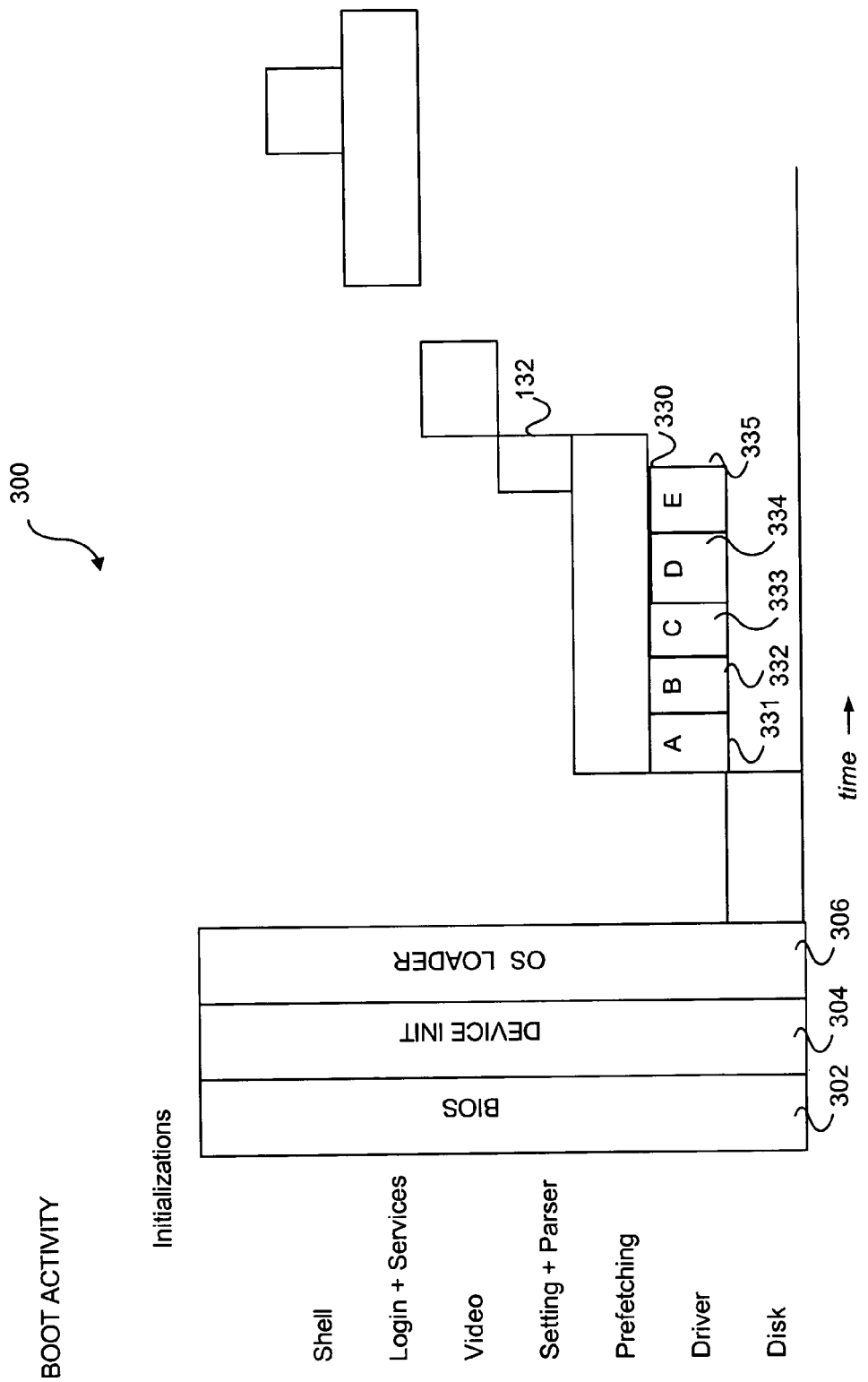
FIG. 3 shows a graph of boot activity according to an embodiment of the system and method described herein.

FIG. 3 is an example of possible startup boot activity 300 according to the system and method described herein. The BIOS stage 302 is integrated with a new stage, option-ROM INIT 304. The hardware configuration begins before the OS Loader stage 306 starts and occurs in parallel to the OS Loader and disk operations. Device initialization tasks A 331, B 332, C 333, D 334, and E 335 require no polling or waiting, and thus complete sooner.

The option-ROM configuration takes a minimal amount of time because it does not wait for an operation to complete or poll on any status registers. In one embodiment, the option-ROM configuration would write a list of device driver defined values to a list of driver-defined registers. Many data access requests can then start "in parallel," i.e., each successive operation beginning before the completion of the prior request. This allows the device driver to simply control the operation of the option-ROM configuration function. These register-data pairs can be stored in option-ROM accessible non-volatile memory. In other embodiments, the option-ROM initialization stage logic may be implemented in scripts or pre-compiled code.

In a further embodiment, the underlying hardware device may support an initialization signature register. This register would be the last register written to by the option-ROM init stage and could be read by the device driver when it loads to determine in what configuration, or state, the option-ROM placed the hardware. Additionally, this register would be self-clearing when any other device registers are changed, such as via writes or destructive reads. This provides a simple communication method which allows device drivers to know the current configuration of the hardware. This allows the device driver to trust the state of the underlying hardware; therefore the driver does not need to force the hardware into a known state and restart the device configuration, and thereby waste time. Methods of the prior art could have reset a device three times in order to place the device into the desired state.

The values used in the initialization signature register could either be taken from a well-defined list or bits in the register could have specific meaning, such as bit 0 indicates if autoneg (auto negotiate) is on or off. Alternatively, the signature value could be a hash of the register and or values written.

By using an initialization signature register, it is also possible for the driver to write a signature when the device is shut down or the driver is unloaded. This will allow subsequent software, such as another driver instance, diagnostics or the option-ROM, to know the current state of the underlying hardware. This provides the benefits of a fast loading driver even without the use of the option-ROM in cases where the driver or other software using the present system and method was previously loaded. The option-ROM would be able to read the signature and, if the device is configured correctly, exit without any additional work. This embodiment would be especially useful in reboot or wake-up situations.

An exemplary use of the system and method described herein is for changing user preferences for a Network Interface Card (NIC). In this exemplary embodiment, the option-ROM resets the hardware and configures it to default parameters. As part of this procedure, the option-ROM writes the default configuration code into the initialization signature register, as described above. System startup continues and eventually the device driver loads. The NIC device driver reads the initialization signature register and completes any hardware initiation that is required.

After the system boots, if the user runs a NIC configuration tool, such as the PROSet II utility for the Intel® PRO/1000 family of Gigabit desktop and server adapters, available from Intel Corporation, and configures the link, for instance, to be forced to 100 Megabit, full duplex, rather than using the default of auto-negotiating link. The configuration utility changes the driver's parameters and modifies the option-ROM'register list and values then reloads the driver. The next time the system starts up, the option-ROM configures the link control registers to the user's requested settings. The driver will not need to restart link configuration to use these user selected (non-default) settings, as would have been needed according to prior art.

Figure 4:
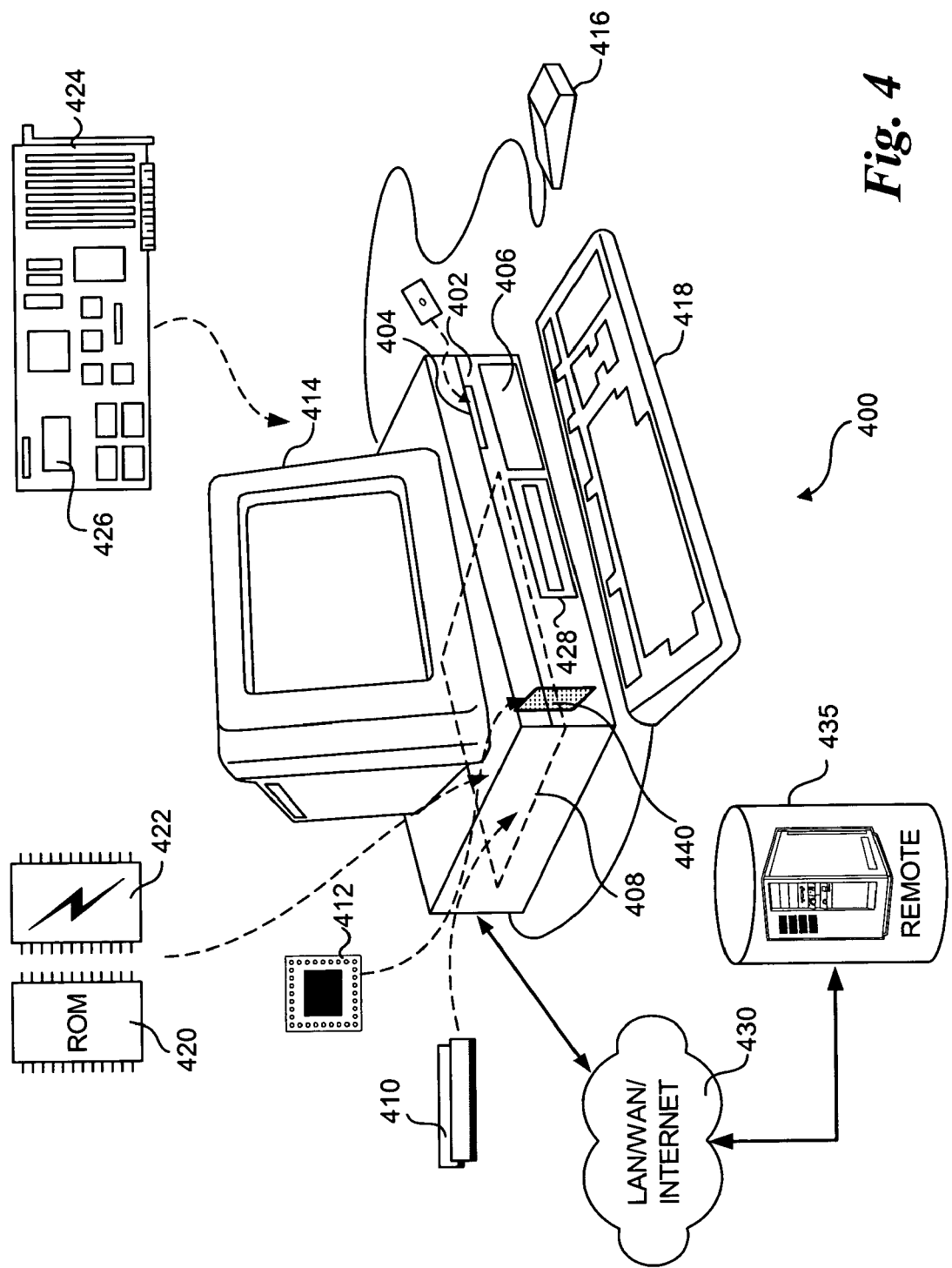
FIG. 4 is a block diagram of an exemplary embodiment of a computer system illustrating an environment of use for the disclosed system and method.

FIG. 4 illustrates an embodiment of an exemplary computer system 400 for practicing an embodiment of the system and method, as described above. Computer system 400 is generally illustrative of various types of computer devices, including any computational device known in the art, such as a personal computer, a workstation, a server, a mainframe, a hand held computer, a palm top computer, personal digital assistant (PDA), a telephony device, a network appliance, a convergence device, etc. For simplicity, only the basic components of the computer system are discussed herein. Computer system 400 includes a processor chassis 402, which houses various hardware components, including a floppy disk drive 404, a hard disk 406, a power supply (not shown), and a motherboard 408. The motherboard is populated with appropriate integrated circuits, including system memory 410 coupled to one or more processors 412. System memory 410 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or similar component. Processor 412 may be a conventional microprocessor including, but not limited to, an Intel Corporation x86, Pentium, or Itanium family microprocessor, a Motorola family microprocessor, or similar component. Hard disk 406 may comprise a single unit, or multiple units, and may optionally reside outside of computer system 400. The computer system 400 also includes a boot firmware device on which firmware is stored, which may typically comprise non-volatile memory such as a ROM device 420 or a flash device 422. Other non-volatile memory devices include, but are not limited to, an Erasable Programmable Read Only Memory (EPROM), an Electronically Erasable Programmable Read Only Memory (EEPROM), or similar. The motherboard may include other firmware devices as well (not shown). In general, the system's processors will comprise 32- or 64-bit architectures, and the system memory will include physical addressing schemes appropriate to the processor(s), and may be accessed via corresponding address and data buses to which the processor(s) and the memory are connected.

A monitor 414 may be included for displaying graphics and text generated by firmware, software programs and program modules that are run by computer system 400, such as system information presented during system boot. A mouse 416 (or other pointing device) may be connected to a serial port, USB port, or other like bus port communicatively coupled to processor(s) 412. A keyboard 418 may be communicatively coupled to motherboard 408 in a similar manner as mouse 416 for user entry of text and commands. In one embodiment, computer system 400 also includes a network interface card NIC or built-in NIC interface 440 for connecting computer system 400 to a communication network 430, using any one of several types of data transmission media including, for example, twisted wire pair cabling, coaxial cabling or fiber optic cabling. Alternatively, the NIC 440 may be coupled to the communication network 430 by a wireless data link. However, these are merely examples of data transmission media that may be used to transmit data from a communication network to a NIC and embodiments of the present invention are not limited in these respects. In one embodiment network 430 is further coupled to a remote computational device 435, such that computer system 400 and remote computer 435 can communicate.

The illustrated embodiment further includes an optional add-in card 424 that is coupled to an expansion slot of motherboard 408. In one embodiment, add-in card 424 includes an option-ROM 426 on which firmware is stored. Computer system 400 may also optionally include a compact disk read only memory ("CD-ROM") drive 428 into which a CD ROM disk may be inserted so that executable files, such as an operating system, and data on the disk can be read or transferred into system RAM 410 and/or hard disk 406. Other mass memory storage devices may be included in computer system 400.

In another embodiment, computer system 400 is a handheld, or palmtop, computer, which is sometimes referred to as a personal digital assistant (PDA). Handheld computers may not include a hard disk or other mass storage, and the executable programs are loaded from a corded or wireless network connection into memory 410 for execution by processor 412. A typical computer system 400 will usually include at least a processor 412, memory 410, and a bus (not shown) coupling the memory 410 to the processor 412.

It will be apparent to one of ordinary skill in the art that in one embodiment, computer system 400 is controlled by operating system software that includes a file management system, such as a disk operating system, which is part of the operating system software. For example, one embodiment utilizes Microsoft® Windows™ as the operating system for computer system 400. In another embodiment, other operating systems such as, for example, but not limited to the Apple Macintosh® operating system, the Linux operating system, the Microsoft® Windows™ CE operating system, the Unix™ operating system, the 3Com Palm® operating system, or other, may also be used in accordance with the teachings of the system and method described herein.

In one embodiment, FIG. 5 shows an exemplary block diagram of the computer system. Processor 412 communicates with a memory controller hub (MCH) 502, also known as Northbridge, via the front side bus 504. The MCH 502 communicates with system memory 410 via a memory bus 506. The MCH 502 may also communicate with an advanced graphics port (AGP) 508 via a graphics bus 510. The MCH 502 communicates with an I/O controller hub (ICH) 520, also known as Southbridge, via a peripheral component interconnect (PCI) bus 522. The ICH 520 may communicate with a plurality of devices 530 and 532. The devices 530 and 532 may have embedded instructions, i.e., option-ROMs. The processor 412 may also communicate with an add-in card 424, wherein the add-in card 424 is seated in an expansion slot on the motherboard. The add-in card 424 may have an option-ROM 426, as well.

Figure 6:
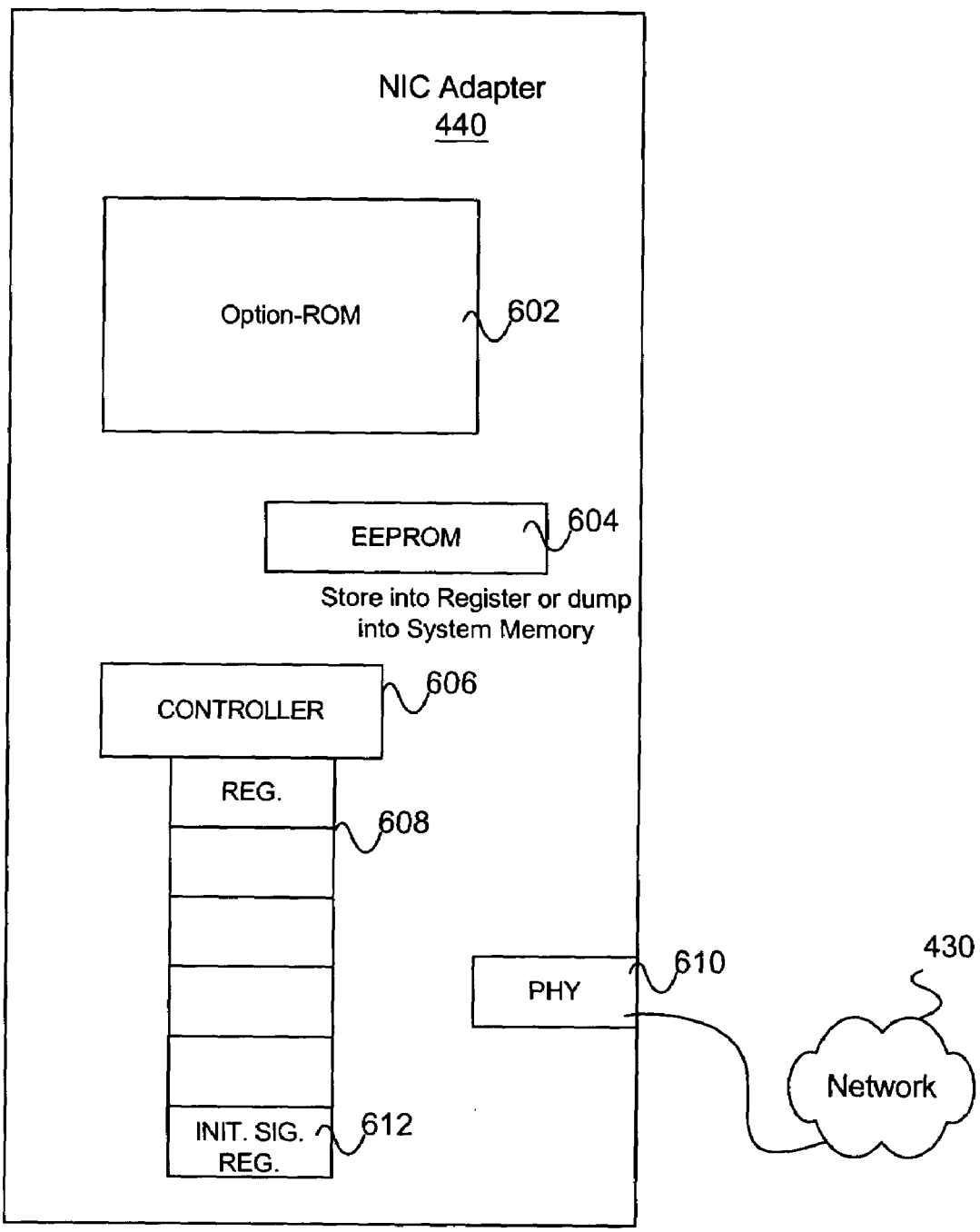
FIG. 6 is a block diagram of an exemplary network interface card adapter with an option-ROM.

FIG. 6 is a block diagram showing and exemplary NIC 440, as described in the example above. The NIC adapter 440 has an option-ROM 602 with instructions to be processed during pre-boot. In one embodiment, the NIC 440 has an EEPROM 604 which contains state and configuration information about the NIC. In one embodiment, the NIC 440 has a register controller 606 and a bank of registers 608. The NIC 440 communicates to a network 430 via a port 610.

In this exemplary embodiment, the controller 606 reads data from the EEPROM 604 during pre-boot. The data may be stored in registers 609 or in system memory 410, or in other memory locations, as appropriate. In one embodiment the BIOS reads the option-ROM 602 during pre-boot and determines which information must be retrieved to complete initialization. In this example, the information is requested from the EEPROM 604 and the BIOS continues with initialization of the next device. In another embodiment, device initialization and state data are stored in an initialization signature register 612 which is accessible by both the BIOS and device drivers.

Figure 7:
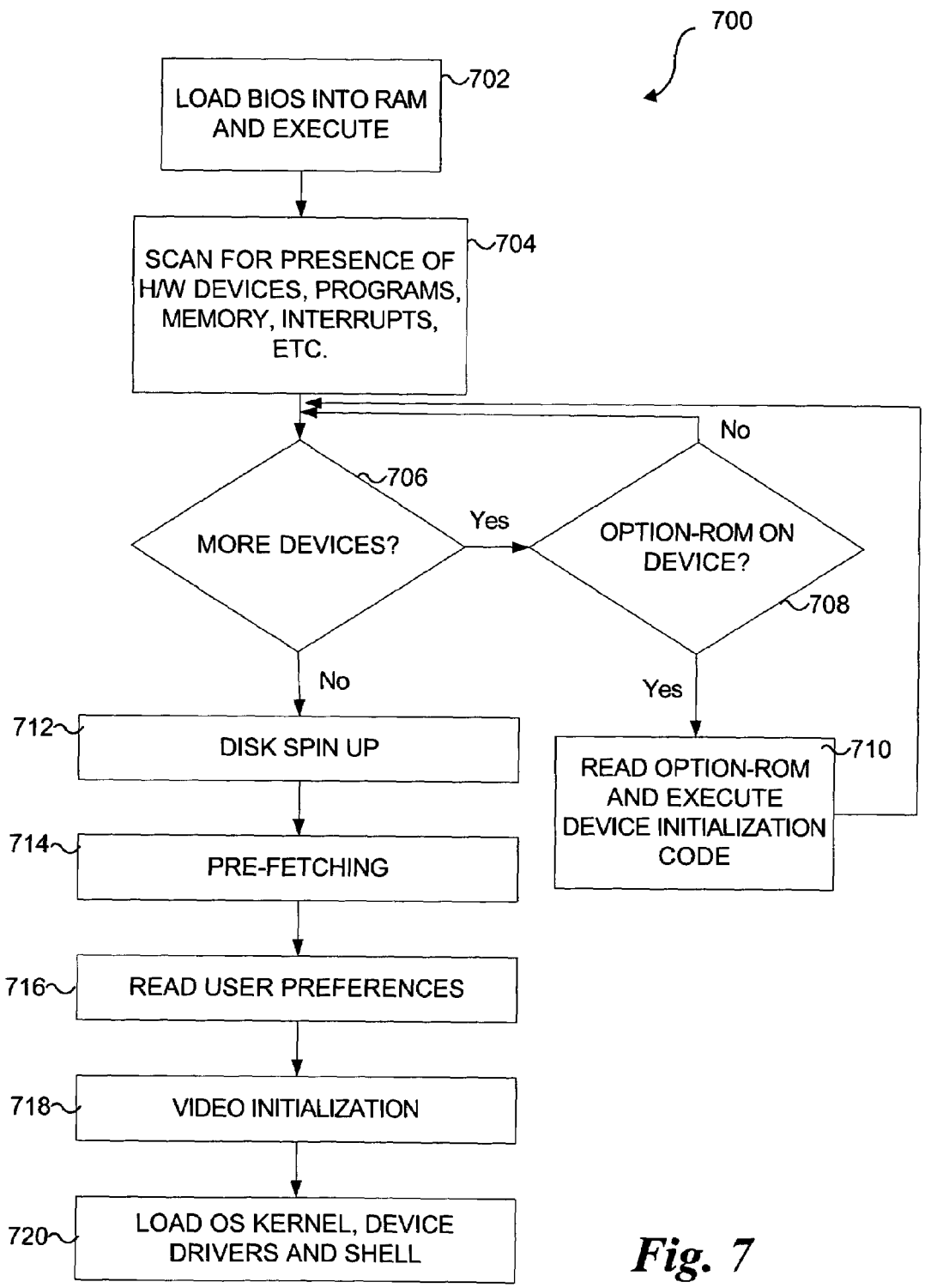
FIG. 7 is a flow diagram of an exemplary pre-boot process according to the system and method disclosed herein.

Now referring to FIG. 7, there is shown a flow diagram of an exemplary pre-boot process 700, according to the system and method disclosed herein. In this exemplary pre-boot, the BIOS is read from the boot firmware device (420 or 422) in block 702. The BIOS is executed and scans the computer system for the presence of hardware devices, programs, memory, interrupts, etc., in block 704. If there are more devices, as determined in block 706, the device is scanned for on-board firmware having extended code, or option-ROM, in block 708. If the device contains an option-ROM, as determined in block 708, then the option-ROM is read and executed. In some cases the option-ROM may contain certain device initialization information. In this case, the device initialization tasks are performed in block 710, prior to the loading of the device drivers. When there are no more drivers, as determined in block 706, pre-boot continues. The disks are spun up (block 712), and operating system and application software that will be used during or soon after OS initiation from the hard drive to memory is loaded (block 714). User preferences are read in block 716 and video initialization is performed in block 718. The operating system (OS) kernel, device drivers and OS shell are loaded in block 720. Control is now passed to the OS and pre-boot is complete. It will be apparent to one of ordinary skill in the art that some of the items described above may be omitted or performed in an alternate order, or performed in parallel.

Thus, various embodiments may be used as, or to support, a firmware and software code executed upon some form of processing core (such as processor 412) or otherwise implemented or realized upon or within a machine-readable medium. A machine-readable medium includes any mechanism that provides (i.e., stores and/or transmits) information in a form readable by a machine (e.g., a computer, network device, personal digital assistant, manufacturing tool, any device with a set of one or more processors, etc.). For example, a machine-readable medium can include, but is not limited to, magnetic storage medium (e.g., hard disk drives, floppy disks, tape, etc.), optical storage (CD ROMs, DVD ROMs, optical disks, etc.), volatile and non volatile memory devices (e.g., EEPROMs, ROMs, PROMs, RAMs, DRAMs, SRAMs, flash, firmware, programmable logic, etc.) or other logic. In addition, a machine-readable medium can include propagated signals such as electrical, optical, acoustical or other form of propagated signals (e.g., carrier waves, infrared signals, digital signals, etc.).

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components.

The above description of illustrated embodiments of the present system and method, including what is described in the Abstract, is not intended to be exhaustive or to limit the system and method to the precise forms disclosed. While specific embodiments of, and examples for, the system and method are described herein for illustrative purposes, various equivalent modifications are possible within the scope of the system and method, as those skilled in the relevant art will recognize.

These modifications can be made in light of the above detailed description. The terms used in the following claims should not be construed to limit the system and method to the specific embodiments disclosed in the specification and the claims. Rather, the scope of the invention is to be determined entirely by the following claims, which are to be construed in accordance with established doctrines of claim interpretation.

What is claimed is:

1. A method for booting a computing device, comprising:
   executing an initial computer code for booting the computing device; and
   splitting device initialization operations between a corresponding device driver and computer code residing on a corresponding hardware component, the computer code residing in non-volatile memory on the corresponding hardware component, and the device initialization operations comprising operations to be performed by a device driver on legacy systems.

2. The method as recited in claim 1, wherein the corresponding device driver is loaded after corresponding initialization operations residing in non-volatile memory on the corresponding hardware component are complete.

3. The method as recited in claim 1, wherein the corresponding device driver and computer code resident on the corresponding hardware component operate asynchronously during system initialization.

4. The method as recited in claim 1, wherein operations of the computer code residing on a corresponding hardware component are indicated in an initialization signature register.

5. The method as recited in claim 1, wherein initialization tasks for a plurality of devices are performed prior to execution of the corresponding device drivers, wherein the initialization task for each of the plurality of devices reside in non-volatile memory on a corresponding hardware component.

6. The method as recited in claim 1, wherein the non-volatile memory is flash random access memory (RAM).

7. The method as recited in claim 1, wherein the non-volatile memory includes an option-ROM coupled with the hardware component device corresponding to the device driver.

8. The method as recited in claim 7, further comprising:
   writing to a corresponding initialization signature register, by the option-ROM;
   reading the corresponding initialization signature register, by the corresponding device driver; and
   determining a desired state of the hardware component based on the corresponding initialization register.

9. The method as recited in claim 8, further comprising:
   clearing the initialization signature register, when a device register of the corresponding hardware component has changed.

10. The method as recited in claim 1, wherein the computer code comprises a basic input/output system (BIOS).

11. A boot system for a computing device, comprising:
    firmware operatively coupled to a processor, the firmware having computer code for performing system boot;
    a plurality of hardware devices operatively coupled to the processor, wherein each of the plurality of devices has a corresponding device driver, the corresponding device drivers being loaded upon system boot; and
    at least one read only memory device, wherein computer code stored on the at least one read only memory device performs initialization tasks for a corresponding device driver, wherein the initialization tasks comprise operations to be performed by a device driver on a legacy system, and wherein the initialization tasks are performed prior to loading the corresponding device driver.

12. The boot system as recited in claim 11, wherein the read only memory device is an option-ROM.

13. The boot system as recited in claim 12, wherein the option-ROM is one of an EPROM, EEPROM and flash memory.

14. The boot system as recited in claim 12, wherein at least one option-ROM is imbedded in at least one of the plurality of hardware devices operatively coupled to the processor.

15. The boot system as recited in claim 11, further comprising one or more initialization signature registers, wherein an initialization signature register indicates a state or configuration of a corresponding hardware device.

16. The boot system as recited in claim 15, wherein the one or more initialization signature registers is one of a plurality of registers embedded in the corresponding hardware device.

17. The boot system as recited in claim 16, wherein one or more of the initialization registers is self-clearing.

18. A computing device, comprising:
    a processor; and
    a flash memory device operatively coupled to the processor on which firmware instructions are stored, which when executed by the processor, perform boot up operations comprising:
    initializing a configuration for a mass storage device, an operating system being stored on the mass storage device;
    executing computer code for performing start up tasks;
    retrieving computer code from non-volatile memory coupled to a hardware device;
    executing the retrieved computer code, the retrieved computer code defining tasks that are to be performed prior to execution of a corresponding device driver, the tasks comprising operations to be performed by a device driver on legacy systems, and storing initialization information accessible by the corresponding device driver;
    loading a plurality of device drivers corresponding to a plurality of hardware devices operatively coupled to the processor, wherein at least one device driver utilizes corresponding stored initialization information; and
    launching the operating system.

19. The computing device as recited in claim 18, wherein the retrieved computer code resides on an option-ROM coupled to a hardware device.

20. A machine readable medium comprising instructions for running a process to boot a computing system, the instructions structured to cause a machine to:
    initialize a configuration for a mass storage device, an operating system being stored on the mass storage device;
    execute instructions for performing start up tasks;
    retrieve instructions from non-volatile memory coupled to a hardware device;
    execute the retrieved instructions, the retrieved instructions defining tasks that are to be performed prior to execution of a corresponding device driver, wherein the tasks comprise operations to be performed by a device driver on legacy systems;
    store initialization information accessible by the corresponding device driver; and
    load a plurality of device drivers corresponding to a plurality of hardware devices operatively coupled to the processor, wherein at least one device driver utilizes corresponding stored initialization information.

21. The machine readable medium as recited in claim 20, wherein the instructions are further structured to launch the operating system.

22. The machine readable medium as recited in claim 20, wherein the instructions are retrieved from an option-ROM coupled to a hardware device.

23. A method for pre-booting a computing device, comprising:
   initializing a configuration for a mass storage device, an operating system being stored on the mass storage device;
   executing computer code for performing start up tasks;
   retrieving computer code from non-volatile memory coupled to a hardware device;
   executing the retrieved computer code, the retrieved computer code defining tasks that are to be performed prior to execution of a corresponding device driver, the tasks comprising operations to be performed by a device driver on legacy systems, and storing initialization information accessible by the corresponding device driver; and
   loading a plurality of device drivers corresponding to a plurality of hardware devices operatively coupled to the processor, wherein at least one device driver utilizes corresponding stored initialization information.

24. The method as recited in claim 23, further comprising launching the operating system.

25. The method as recited in claim 23, wherein the retrieved computer code resides on an option-ROM coupled to a hardware device.

26. A machine readable storage medium comprising instructions for booting a computing system, the instructions structured to cause a machine to:
   execute an initial computer code for booting the computing device; and
   split device initialization operations between a corresponding device driver and a computer code residing on a corresponding hardware component, the computer code residing in non-volatile memory on the corresponding hardware component, and the device initialization operations comprising operations to be performed by a device driver on legacy systems.

27. The machine readable medium as recited in claim 26, wherein the corresponding device driver is loaded after corresponding initialization operations residing in non-volatile memory on the corresponding hardware component are complete.

28. The machine readable medium as recited in claim 26, wherein the corresponding device driver and computer code resident on the corresponding hardware component operate asynchronously during system initialization.

29. The machine readable medium as recited in claim 26, wherein the resident computer code operations are indicated in an initialization signature register.

* * * * *

UNITED STATES PATENT AND TRADEMARK OFFICE
CERTIFICATE OF CORRECTION

PATENT NO.         : 7,181,609 B2
APPLICATION NO. : 10/641681
DATED              : February 20, 2007
INVENTOR(S)       : Connor et al.

It is certified that error appears in the above-identified patent and that said Letters Patent is hereby corrected as shown below:

In column 9, at line 35, delete the first occurrence of "device".
In column 10, at line 45, after "readable" insert --storage--.

Signed and Sealed this

Fifteenth Day of April, 2008

JON W. DUDAS
*Director of the United States Patent and Trademark Office*